United States Patent
Lu (10) Patent No.: US 11,359,752 B2
(45) Date of Patent: Jun. 14, 2022

(54) QUICK CONNECTOR FOR REMOVABLE JOINING OF TWO PIPES

(71) Applicant: PPI XIAMEN INDUSTRY CO., LTD., Xiamen (CN)

(72) Inventor: Wenrong Lu, Xiamen (CN)

(73) Assignee: PPI XIAMEN INDUSTRY CO., LTD., Xiamen (CN)

(*) Notice: Subject to any disclaimer, the term of this patent is extended or adjusted under 35 U.S.C. 154(b) by 221 days.

(21) Appl. No.: 16/680,459

(22) Filed: Nov. 11, 2019

(65) Prior Publication Data

US 2020/0158273 A1 May 21, 2020

(30) Foreign Application Priority Data

Nov. 19, 2018 (CN) .......................... 201811372190.4

(51) Int. Cl.
  *F16L 37/098* (2006.01)
  *F16L 37/02* (2006.01)
(52) U.S. Cl.
  CPC .......... *F16L 37/0985* (2013.01); *F16L 37/025* (2013.01)
(58) Field of Classification Search
  CPC ........................... F16L 37/0985; F16L 37/133

USPC .......................................................... 285/319
See application file for complete search history.

(56) References Cited

U.S. PATENT DOCUMENTS

| | | | | |
|---|---|---|---|---|
| 5,607,190 A | * | 3/1997 | Exandier | F16L 37/0985 285/319 |
| 6,062,537 A | * | 5/2000 | Chih | F16L 37/0985 |
| 6,328,344 B1 | * | 12/2001 | Tozaki | F16L 37/0985 |
| 7,695,024 B2 | * | 4/2010 | Ostergren | |
| 2006/0208485 A1 | * | 9/2006 | Discher | F16L 37/0985 285/319 |

* cited by examiner

*Primary Examiner* — Zachary T Dragicevich
(74) *Attorney, Agent, or Firm* — W&KIP (57) ABSTRACT

A quick connector for removable join of two pipes is provided by the present disclosure, which includes: a quick joint, an elastic pressing sleeve and a quick connection body; wherein the quick joint is a member for passing water, and is composed of a water pipe joint and a plug-in portion; an outer side wall of the plug-in portion is provided with a fixing groove and sealing ring grooves; an inner side wall of the elastic pressing sleeve is provided with an elastic insert that is capable of being ejected outwardly, and the elastic insert is disposed on the inner side wall of the elastic pressing sleeve in a cross sectional direction and extends inwardly.

6 Claims, 8 Drawing Sheets

QUICK CONNECTOR FOR REMOVABLE JOINING OF TWO PIPES

CROSS-REFERENCE TO RELATED APPLICATIONS

This application claims priority to Chinese Patent Application No. 201811372190.4 with a filing date of Nov. 19, 2018. The content of the aforementioned applications, including any intervening amendments thereto, are incorporated herein by reference.

FIELD OF THE INVENTION

The present disclosure relates to the field of sanitary ware, and in particular to a quick connector for removable joining of two pipes.

BACKGROUND OF THE INVENTION

A quick connector for removable joining of two pipes is a connector that enables the pipes to be connected or disconnected without the need for tools. In the sanitary industry, it is often required to carry out the installation and conduction of pipes. For the convenience of use and installation, the use of quick plug connectors has become a very common phenomenon. Typically, when installing a water outlet pipe of a basin or sink faucet in the kitchen or bathroom, the installer needs to squat down to operate under the sink or the basin. Since the space under the sink or basin is small, the operation is inconvenient, and water leakage may be easily caused by insufficient connection. Therefore, it is necessary to design a structure that can be quickly and conveniently installed so as to overcome such a problem. Currently, the commonly used quick plug connectors are generally designed to achieve unplugging by being pressed on both sides, thus making them troublesome to use, and the design of the two-side pressing cannot achieve a further reduction of the size of quick plug connector. Therefore, there is a greater possibility of interference during installation.

SUMMARY OF THE INVENTION

An object of the present disclosure is to provide a quick connector for removable joining of two pipes, which is smaller in size, operable by one hand, and more convenient to be plugged and unplugged.

In order to achieve the above object, a quick connector for removable joining of two pipes is provided by the present disclosure, which includes: a quick joint, an elastic pressing sleeve and a quick connection body; wherein the quick joint is a member for passing water, and two ends of the quick joint are provided with a water pipe joint and a plug-in portion respectively; the water pipe joint is configured to be connected to an external water passage, and an outer side wall of the plug-in portion is provided with a fixing groove and at least one sealing ring groove; the elastic pressing sleeve is hollow, and at least a segment of a side wall of the elastic pressing sleeve is formed with slots in an axial direction and a circumferential direction thereof, so that one end of the segment of the side wall forms a free end, and the segment of the side wall is elastically deformable; the segment of the side wall is provided with an elastic insert extending inwardly at a radial position of the segment of the side wall, and the elastic insert is elastically outwardly deformable when urged by an external force; the quick connection body is a tubular member having a cavity in the middle, and a side wall on one end thereof, which is a plug-in end, is provided with a slot corresponding to the elastic insert on the side wall of the elastic pressing sleeve, and the other end is configured to be connected to an external water passage; when the elastic pressing sleeve is placed over an outer wall of the plug-in end of the quick connection body, the elastic insert thereof passes through the slot and is inserted into the interior of the quick connection body; and when the quick joint is inserted into the plug-in end of the quick connection body through the plug-in portion, the elastic insert passing through the slot is captured in the fixing groove of the side wall of the plug-in portion, thereby fixing the quick joint to the quick connection body and realizing water passage conduction between the quick joint and the quick connection body.

According to the above structure, by using the elastic pressing sleeve as an intermediate connection member for connecting and fixing the quick joint and the quick connection body with each other, connection or disconnection between the quick joint and the quick connection body can be achieved very conveniently by merely adjusting relative positions of the elastic insert of the elastic pressing sleeve to the fixing groove of the quick joint and the slot of the quick connection body by one hand.

DETAILED DESCRIPTION OF THE EMBODIMENT(S) OF THE INVENTION

The present disclosure will be described in detail below with reference to the drawings and specific embodiments.

First Embodiment

As shown in FIGS. 1 to 6, a quick connector 1 for removable joining of two pipes includes a quick joint 2, an elastic pressing sleeve 3, and a quick connection body 4. The quick joint 2 is a member for passing water, and two ends of the quick joint 2 are provided with a water pipe joint 21 and a plug-in portion 22 respectively; a step face 25 is formed between the water pipe joint 21 and the plug-in portion 22; an outer side wall of the plug-in portion 22 is provided with a fixing groove 23, and two sealing ring grooves in which sealing rings 24 are disposed. A distal end 221 of the plug-in portion 22 has a tapered guiding surface 2211. A flange 222 on a side of the fixing groove 23 toward the distal end of the plug-in portion 22 has a tapered guiding surface 2221. The elastic pressing sleeve 3 has a cylindrical shape, and at least a segment of a side wall of the elastic pressing sleeve 3 is formed with slots in an axial direction and a circumferential direction thereof. Specifically, in the present embodiment, the segment of the side wall is provided with two slots 311 and 312 in the circumferential direction, which are spaced apart up and down. At least one end of the segment of the side wall forms a free end so that the segment of the side wall is formed with a first elastic side wall 31 that is elastically deformable. The first elastic side wall 31 is provided with an elastic insert 32 extending inward in a lateral direction. A cross section of the elastic insert 32 is gradually widened from a fixed end of the side wall to the free end. An inner end of the elastic insert 32 on a side toward the free end is formed with a hook portion 321 having an arc-shaped contour on an outer edge thereof. The arc contour is matched with the contour of the fixing groove 23 of the quick joint 2. More preferably, an outer edge of the inner end of the elastic insert 32 is provided with a guiding slope 322 for facilitating the insertion of the plug-in portion 22 of the quick joint 2; meanwhile, the free end of the first elastic side wall 31 is provided with an outwardly extending abutting surface 323, and an elastic pressing member 33 is formed on a side opposite to the abutting surface 323. A fixed end of the elastic pressing member 33 is connected to the side wall, and a free end thereof faces the abutting surface 323 of the first elastic side wall 31. More specifically, the elastic pressing sleeve 3 has a "7"-like shape, and a bent portion thereof faces the abutting surface 323 of the first elastic side wall 31. The quick connection body 4 is a tubular member having a cavity in the middle, and a side wall at one end thereof, which is a plug-in end 42, is provided with a slot 41 corresponding to the elastic insert 32 on the side wall of the elastic pressing sleeve 3, and the other end is further provided with a one-way valve 44 in the cavity to ensure that water flows into or out of the plug-in portion 22 of the quick joint 2 unidirectionally through the quick connection body 4. Meanwhile, a threaded port 43 is disposed at a distal end of the quick connection body 4 for connection with an external water passage. At the same time, a limit fit is formed between the elastic pressing sleeve 3 and the quick connection body 4. Specifically, an inner side wall of the elastic pressing sleeve 3 is provided with a positioning slide groove 35 in the axial direction thereof, and the quick connection body 4 is provided with a positioning rib 45 which is nested within the positioning slide groove 35. When the positioning slide groove 35 and the positioning rib 45 are nested and fitted with each other, it is ensured that the elastic pressing sleeve 3 does not rotate relative to the quick connection body 4.

Figure 1:
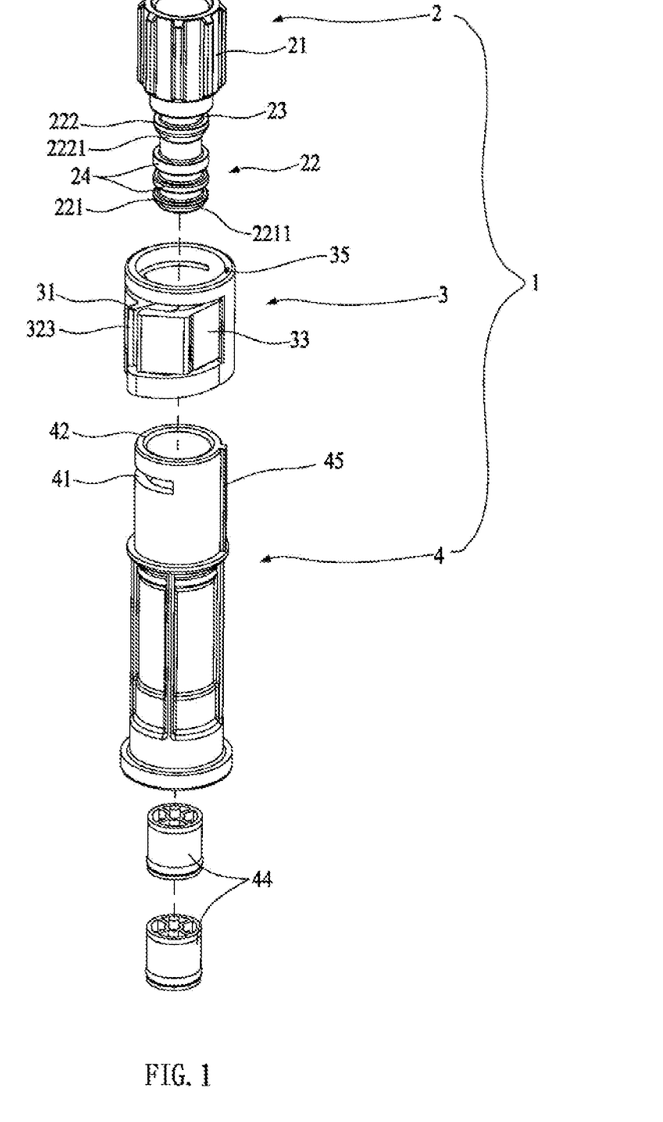
FIG. 1 is an exploded view of a first embodiment of the present disclosure.
Figure 2:
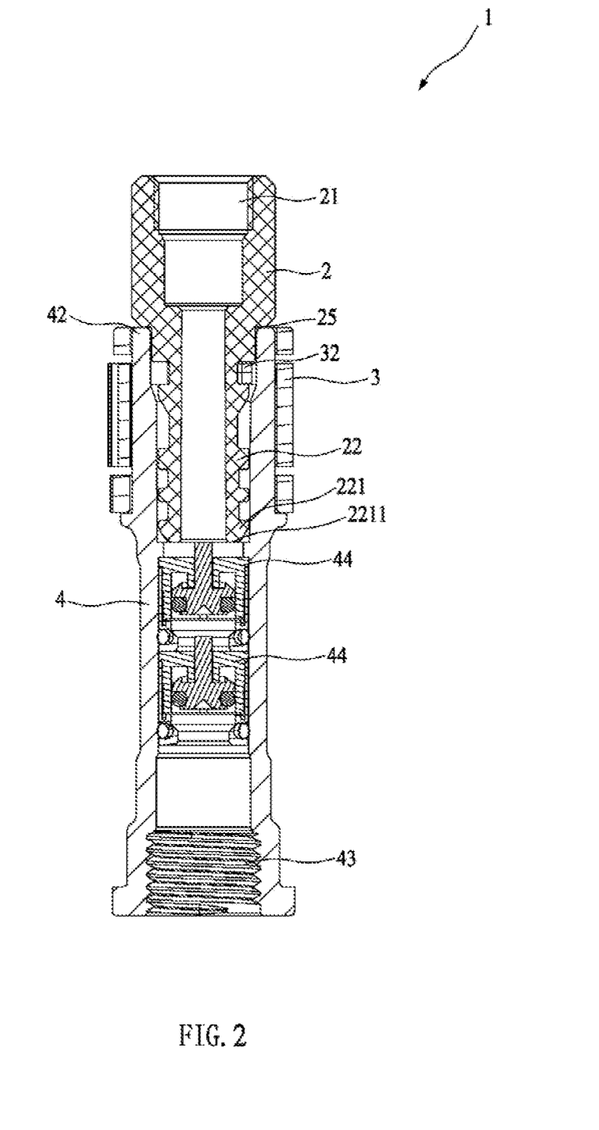
FIG. 2 is a cross-sectional view showing the first embodiment of the present disclosure.
Figure 3:
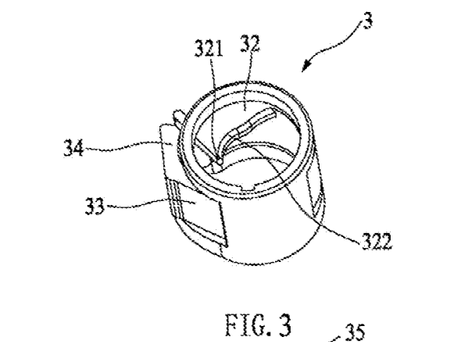
FIG. 3 is a first perspective view of an elastic pressing sleeve of the first embodiment of the present disclosure.
Figure 4:
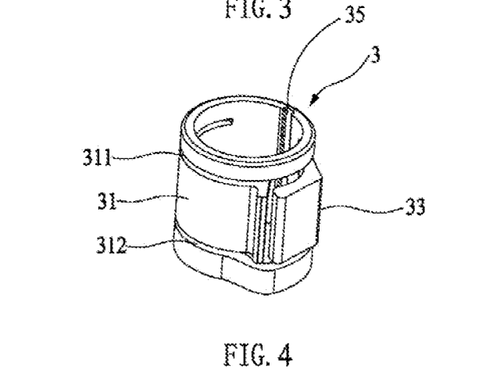
FIG. 4 is a second perspective view of the elastic pressing sleeve of the first embodiment of the present disclosure.
Figure 5:
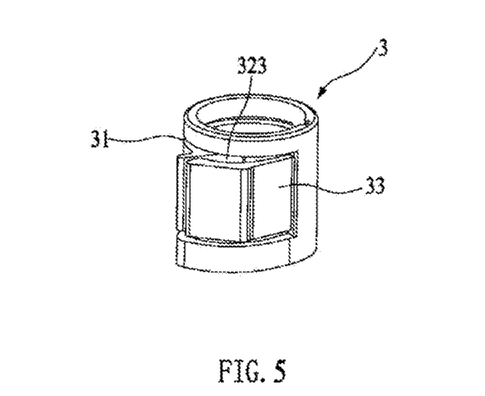
FIG. 5 is a third perspective view of the elastic pressing sleeve of the first embodiment of the present disclosure.
Figure 6:
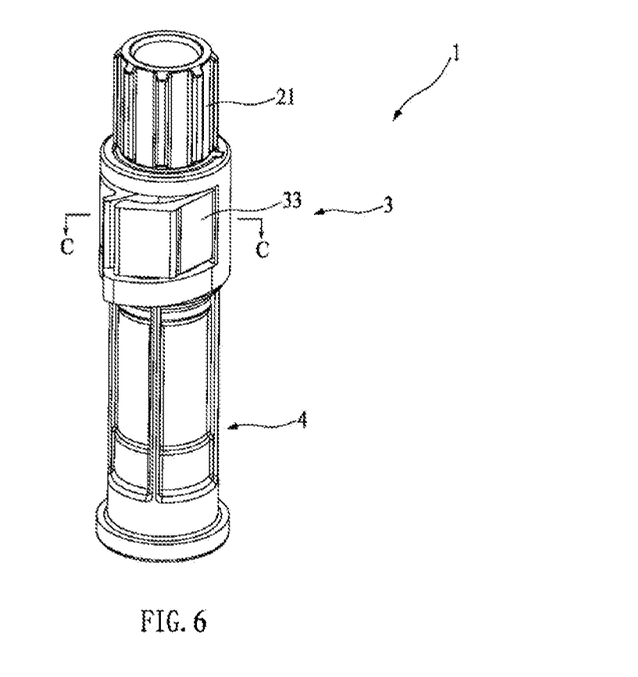
FIG. 6 is a perspective view of the first embodiment of the present disclosure.
Figure 7:
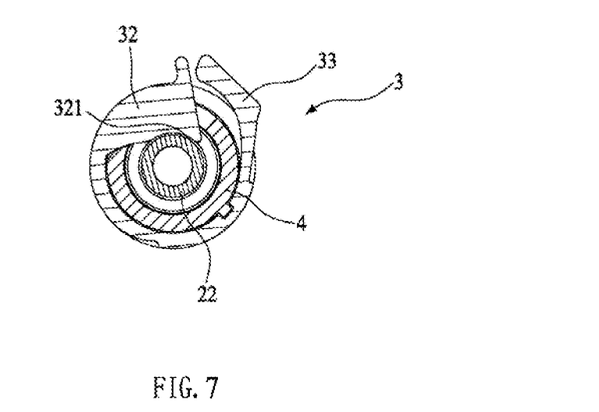
FIG. 7 is a sectional view along line C-C in FIG. 6 according to the first embodiment of the present disclosure.

As shown in FIG. 7, when it is required to connect the quick joint 2 with the quick connection body 4, the elastic pressing sleeve 3 is placed over the outer wall of the plug-in end 42 of the quick connection body 4. When the elastic insert 32 passes through the slot 41 and is inserted into the interior of the quick connection body 4, since the quick joint 2 has two tapered guiding surfaces 2221 and 2211 from top to bottom, and the elastic insert 32 is provided with the guiding slope 322 on the outer edge of the inner end thereof, the plug-in portion 22 of the quick joint 2 will drive the elastic insert 32 to be ejected outward during the insertion process of the plug-in portion 22 of the quick joint 2 until the step face 25 of the quick joint 2 abuts against the end surface of the elastic pressing sleeve 3. At this point, the elastic insert 32 is just opposite to the fixing groove 23, and the elastic insert 32 passing through the slot 41 is captured in the fixing groove 23 of the side wall of the plug-in portion 22. The arc contour of the hook portion 321 of the elastic insert 32 is matched with the outer wall of the fixing groove 23 in a surrounding manner so that they are fitted to each other, thereby fixing the quick joint 2 to the quick connection body 4. At this point, an interference fit is generated between the sealing rings 24 of the plug-in portion 22 of the quick joint 2 and the inner wall of the plug-in end 42 of the quick connection body 4, thus ensuring no leakage of water will occur between the plug-in portion 22 of the quick joint 2 and the plug-in end 42 of the quick connection body 4, and achieving water passage conduction between the quick joint 2 and the quick connection body 4.

Figure 8:
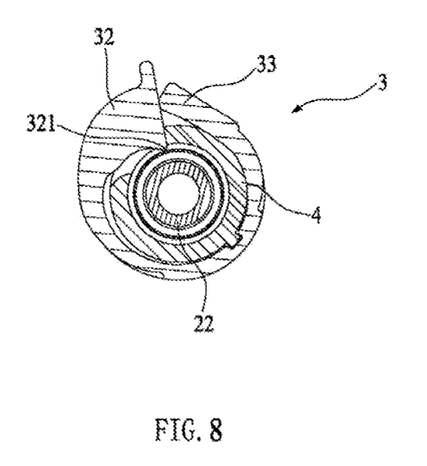
FIG. 8 is a sectional view of the first embodiment of the present disclosure in a disconnection state when a force is applied.

As shown in FIG. 8, when it is required to detach the quick joint 2 from the quick connection body 4, an external force is applied to press the elastic pressing member 33. Since the bent portion faces the abutting surface 323 of the first elastic side wall 31, and the abutting surface 323 extends outward obliquely, once the bent portion of the elastic pressing member 33 abuts against and contacts the abutting surface 323 of the first elastic side wall 31, the first elastic side wall 31 is urged to be elastically deformed outward so that the elastic insert 32 is ejected outward and the elastic insert 32 is disengaged from the fixing groove 23 of the quick joint 2 and the slot 41 of the quick connection body 4 respectively, thereby achieving the detachment of the quick joint 2 from the quick connection body 4.

Second Embodiment

Figure 9:
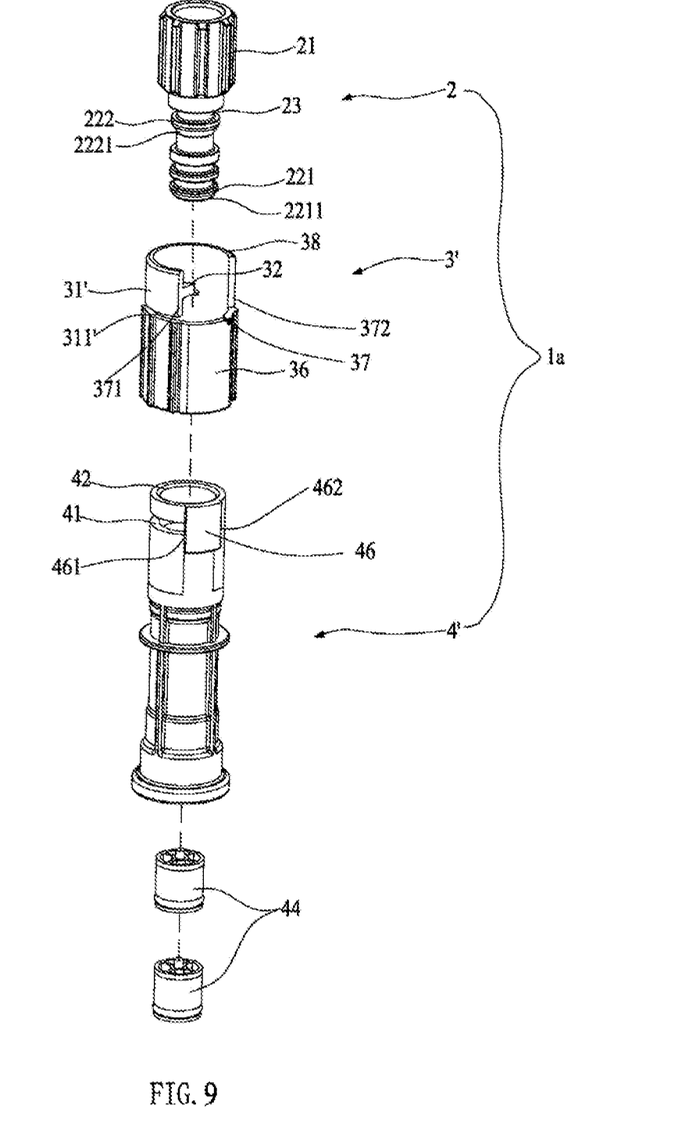
FIG. 9 is an exploded view of a second embodiment of the present disclosure.
Figure 10:
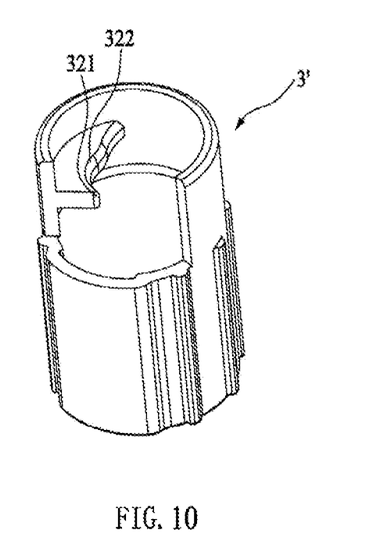
FIG. 10 is a perspective view of an elastic pressing sleeve of the second embodiment of the present disclosure.

As shown in FIGS. 9 to 10, a quick connector 1a for removable joining of two pipes includes a quick joint 2, an elastic pressing sleeve 3' and a quick connection body 4'. The structure of the quick joint 2 in this embodiment is the same as the quick joint 2 disclosed in the first embodiment, and repeated description is omitted herein; the elastic pressing sleeve 3' is composed of an upper side wall 38 and a sleeve body 36 from top to bottom; the upper side wall 38 has a notch 37 in a circumferential direction thereof, and a slot 311' is disposed at least at a connection position of the upper side wall 38 and the sleeve body 36 so that the segment of the upper side wall 38 having the slot 311' forms a second elastic side wall 31' that is elastically deformable. The second elastic side wall 31' is provided with an elastic insert 32 extending inwardly in a lateral direction. The elastic insert 32 has the same structure as the elastic insert 32 disclosed in the first embodiment. The structure of the quick connection body 4' is substantially the same as that of the quick connection body 4 disclosed in the first embodiment, except that a limit boss 46 is added on the outer wall of the plug-in end 42 in a circumferential direction thereof. The circumferential length of the limit boss 46 is smaller than that of the notch 37 of the upper side wall 38, and left and right side edges 461 and 462 of the limit boss 46 may abut against side edges 371 and 372 at the notch 37 of the upper side wall 38 respectively so that they are fitted to each other, thereby limiting an angular range of the rotation of the elastic pressing sleeve 37 relative to the quick connection body 4.

Figure 11:
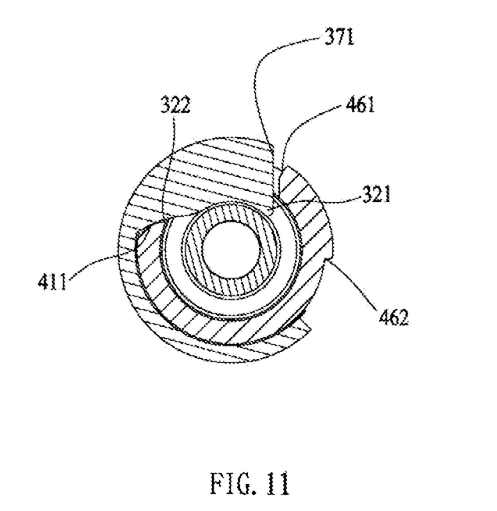
FIG. 11 is a sectional view of the second embodiment of the present disclosure.

As shown in FIG. 11, when it is required to connect the quick joint 2 and the quick connection body 4' with each other, the operational principle is basically the same as that of the first embodiment. That is, it is required to place the elastic pressing sleeve 3 over the outer wall of the plug-in end 42 of the quick connection body 4' so that the elastic insert 32 passes through the slot 41 and is inserted into the interior of the quick connection body 4', and then the plug-in portion 22 of the quick joint 2 is inserted into the plug-in end 42 of the quick connection body 4'. The plug-in portion 22 of the quick joint 2 urges the elastic insert 32 to be ejected outward until the step surface 25 of the quick joint 2 abuts against the end surface of the elastic pressing sleeve 3'. At this point, the elastic insert 32 is just opposite to the fixing groove 23, the elastic insert 32 passing through the slot 41 is captured in the fixing groove 23 of the side wall of the plug-in portion 22, and an inner side wall 411 on at least one vertical end of the slot 41 abuts against the narrowest-width portion 322 of the elastic insert 32. At this point, the quick joint 2 is fixed onto the quick connection body 4', and an interference fit is generated between the sealing rings 24 of the plug-in portion 22 of the quick joint 2 and the inner wall of the plug-in end 42 of the quick connection body 4', thus ensuring no leakage of water will occur between the plug-in portion 22 of the quick joint 2 and the plug-in end 42 of the quick connection body 4', and achieving water passage conduction between the quick joint 2 and the quick connection body 4'.

Figure 12:
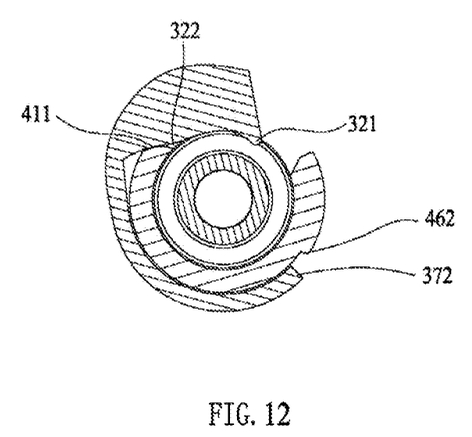
FIG. 12 is a sectional view of the second embodiment of the present disclosure in a disconnection state when a force is applied.

As shown in FIG. 12, when it is required to detach the quick joint 2 from the quick connection body 4', the elastic pressing sleeve 3' needs to be held by the hand to produce a relative rotation of the elastic pressing sleeve 3' to the quick connection body 4'. Through the abutting fit between the inner side wall 411 of the slot 41 and the elastic insert 32, the inner side wall 411 rotates toward the widest part of the cross-sectional width of the elastic insert 32 from the narrowest part, thereby urging the elastic insert 32 to be elastically deformed outward so that the elastic insert 32 is disengaged from the fixing groove 23 of the quick joint 2 and the slot 41 of the quick connection body 4' respectively, thereby achieving the detachment of the quick joint 2 from the quick connection body 4'.

Although there are slight differences between the second embodiment and the first embodiment in terms of specific technical means of driving the elastic insert 32 to be ejected outward, wherein the elastic insert 32 is driven by the elastic pressing member 33 to be ejected outward in the first embodiment, and the elastic insert 32 is ejected outward by means of an abutting fit between the side wall 411 of the slot 41 and the outer edge on the inner end of the elastic insert 32 in the second embodiment, they both belong to the same inventive concept; that is, under the action of an external force, radial positions of the elastic insert 32 relative to the fixing groove 23 of the quick joint 2 and the slot 41 of the quick connection body 4/4' are varied to achieve a connection or disconnection between the quick joint 2 and the quick connection body 4/4'.

The above description merely relates to embodiments of the present disclosure, and is not intended to limit the design of the present disclosure. Any equivalent changes made according to key points of the design of the present disclosure will fall within the scope of protection of the present disclosure.

What is claimed is:

1. A quick connector for removable joining of two pipes, comprising a quick joint, an elastic pressing sleeve, a quick connection body, and a limiting structure;

wherein the quick joint is a member for passing water, and two ends of the quick joint are provided with a water pipe joint and a plug-in portion respectively; the water pipe joint is configured to be connected to an external water passage, and an outer side wall of the plug-in portion is provided with a fixing groove and at least one sealing ring groove;

the elastic pressing sleeve is hollow, and at least a segment of a side wall of the elastic pressing sleeve is formed with slots in an axial direction and a circumferential direction thereof, so that one end of the segment of the side wall forms a free end, and the segment of the side wall is defined as a first elastic side wall; the first elastic side wall is provided with an elastic insert extending inwardly at a radial position of the first elastic side wall; and the free end of the first elastic side wall is provided with an outwardly extending abutting surface, and an elastic pressing member is formed on a side opposite to the abutting surface, a fixed end of the elastic pressing member is connected to the side wall, and a free end thereof faces the abutting surface of the first elastic side wall; when an external force is applied to press the elastic pressing member, the elastic pressing member abuts against and contacts the abutting surface of the first elastic side wall, and the first elastic side wall is urged to be elastically deformed outward;

the quick connection body is a tubular member having a cavity in the middle, and a side wall on one end thereof, which is a plug-in end, is provided with a slot corresponding to the elastic insert on the first elastic side wall of the elastic pressing sleeve, and the other end is configured to be connected to an external water passage;

the limiting structure is formed between the elastic pressing sleeve and the quick connection body to ensure that the elastic pressing sleeve does not rotate relative to the quick connection body;

wherein when the elastic pressing sleeve is placed over an outer wall of the plug-in end of the quick connection body, the elastic pressing sleeve does not rotate relative to the quick connection body, and the elastic insert thereof passes through the slot and is inserted into the interior of the quick connection body; and when the quick joint is inserted into the plug-in end of the quick connection body through the plug-in portion, the elastic insert passing through the slot is captured in the fixing groove of the side wall of the plug-in portion, thereby fixing the quick joint to the quick connection body and realizing water passage conduction between the quick joint and the quick connection body;

wherein the limiting structure between the elastic pressing sleeve and the quick connection body is realized by a positioning slide groove formed in an inner side wall of the elastic pressing sleeve in the axial direction thereof, and a positioning rib disposed on the quick connection body and nested within the positioning slide groove.

2. The quick connector for removable joining of two pipes according to claim 1, wherein an outer edge of the inner end of the elastic insert is provided with a guiding slope for facilitating the insertion of the plug-in portion of the quick joint.

3. The quick connector for removable joining of two pipes according to claim 1, wherein a cross section of the elastic insert is gradually widened from a fixed end of the side wall to the free end, an inner end of the elastic insert on a side toward the free end is formed with a hook portion having an arc-shaped contour on an outer edge thereof; and when the elastic insert is captured in the fixing groove of the side wall of the plug-in portion of the quick joint, the arc-shaped contour of the hook portion is matched with the outer wall of the fixing groove.

4. The quick connector for removable joining of two pipes according to claim 1, wherein a distal end of the plug-in portion of the quick joint has a tapered guiding surface, and a flange on a side of the fixing groove toward the distal end of the plug-in portion has a tapered guiding surface.

5. The quick connector for removable joining of two pipes according to claim 1, wherein the quick connection body is further provided with a one-way valve in the cavity to ensure that water flows into or out of the plug-in portion of the quick joint unidirectionally through the quick connection body.

6. The quick connector for removable joining of two pipes according to claim 1, wherein the elastic pressing sleeve has a bent portion, and the bent portion thereof faces the abutting surface of the first elastic side wall.

* * * * *